US011300253B2

(12) United States Patent
Shen

(10) Patent No.: US 11,300,253 B2

(45) Date of Patent: Apr. 12, 2022

(54) PORTABLE LED SPOTLIGHT AND CONTROL CIRCUIT THEREOF

(71) Applicant: NINGBO TALLER ELECTRICAL APPLIANCE CO., LTD., Yuyao (CN)

(72) Inventor: Jianli Shen, Yuyao (CN)

(73) Assignee: NINGBO TALLER ELECTRICAL APPLIANCE CO., LTD., Yuyao (CN)

(*) Notice: Subject to any disclaimer, the term of this patent is extended or adjusted under 35 U.S.C. 154(b) by 0 days.

(21) Appl. No.: 17/024,730

(22) Filed: Sep. 18, 2020

(65) Prior Publication Data

US 2022/0057053 A1 Feb. 24, 2022

(30) Foreign Application Priority Data

Aug. 20, 2020 (CN) ........................ 202021752553.X
Aug. 20, 2020 (CN) ........................ 202021753904.9

(51) Int. Cl.

| | |
|---|---|
| ***F21L 4/08*** | (2006.01) |
| ***F21V 23/00*** | (2015.01) |
| ***F21V 23/06*** | (2006.01) |
| ***F21L 4/02*** | (2006.01) |
| ***F21L 4/04*** | (2006.01) |
| ***F21V 21/40*** | (2006.01) |

(Continued)

(52) U.S. Cl.

CPC *F21L 4/08* (2013.01); *F21L 4/02* (2013.01); *F21L 4/04* (2013.01); *F21V 21/0965* (2013.01); *F21V 21/406* (2013.01); *F21V 23/002* (2013.01); *F21V 23/004* (2013.01); *F21V 23/0414* (2013.01); *F21V 23/06* (2013.01); *H02J 7/007* (2013.01); *H05B 45/10* (2020.01); *F21Y 2115/10* (2016.08); *H02J 2207/30* (2020.01)

(58) Field of Classification Search

CPC ...... F21L 4/08; F21L 4/02; F21L 4/04; H05B 45/10; F21V 21/0965; F21V 21/406; F21V 23/002; F21V 23/004; F21V 23/0414; F21V 23/06; H02J 7/007; H02J 2207/30; F21Y 2115/10

See application file for complete search history.

(56) References Cited

U.S. PATENT DOCUMENTS 4,535,391 A * 8/1985 Hsiao ........................ F21L 2/00
362/105
6,606,808 B2 * 8/2003 Katz ........................ G09F 13/04
362/234

(Continued)

FOREIGN PATENT DOCUMENTS

CN 208332077 U 1/2019

*Primary Examiner* — Bao Q Truong

(74) *Attorney, Agent, or Firm* — Bayramoglu Law Offices LLC

(57) ABSTRACT

A portable LED spotlight comprises a main light, a connecting frame, side light assemblies and a base is provided. Slots are formed in two sides of the connecting frame. Positioning pins are disposed at the bottoms of the slots. Mounting plates matched with the slots are disposed on the side light assemblies which are connected to the connecting frame through the mounting plates. Each mounting plate includes a connecting block. Grooves allowing the positioning pins to be clamped in the each mounting plate are formed in the connecting blocks. Contacts are disposed on two sides of the grooves. A rotary knob is disposed on the base.

16 Claims, 16 Drawing Sheets

(51) Int. Cl.

| | |
|---|---|
| ***F21V 23/04*** | (2006.01) |
| ***H02J 7/00*** | (2006.01) |
| ***H05B 45/10*** | (2020.01) |
| ***F21V 21/096*** | (2006.01) |
| *F21Y 115/10* | (2016.01) |

(56) References Cited

U.S. PATENT DOCUMENTS

2019/0072242 A1* 3/2019 Worman .................. F21L 4/04
2019/0234587 A1* 8/2019 Ohara .................. F21V 21/406

* cited by examiner

PORTABLE LED SPOTLIGHT AND CONTROL CIRCUIT THEREOF

CROSS REFERENCE TO THE RELATED APPLICATIONS

This application is based upon and claims priority to Chinese Patent Application No. 202021753904.9, filed on Aug. 20, 2020, and Chinese Patent Application No. 202021752553.X, filed on Aug. 20, 2020, the entire contents of which are incorporated herein by reference.

TECHNICAL FIELD

The invention relates to the technical field of lighting, in particular to a portable Light Emitting Diode (LED) spotlight and a control circuit thereof.

BACKGROUND

Spotlights project light by means of collecting lenses or reflectors, can project light by a long distance, and are generally used as main lights in scenes.

The spotlights can emit highly-directed light beams to generate a highlight area and a shadow area with distinct lines. In most cases, the spotlights are used in combination with floodlights to make the outline of the highlight area bright and clear.

Many existing portable spotlights include only one light source for lighting. Some spotlights are composed of multiple light sources. Generally, it is necessary to adopt multiple light sources to meet the requirement for multi-angle lighting; however, these light sources need to be separately controlled to be turned on or off and cannot be controlled in a unified manner, and the battery in each light source has to be charged separately when the spotlights are charged; and when one light source is charged, the other light sources cannot be charged at the same time, which severely limit the use of the spotlights.

SUMMARY

The technical issue to be settled by the invention is to provide a portable LED spotlight to solve the problem that multiple light sources of existing spotlights cannot be controlled, regulated or charged at the same time.

The technical solution adopted by the invention to settle the above technical issue is as follows:

A portable LED spotlight, comprising:

a main light;

a connecting frame disposed above the main light, wherein slots are formed in two sides of the connecting frame, and positioning pins are disposed at bottoms of the slots;

side light assemblies provided with mounting plates matched with the slots and connected to the connecting frame through the mounting plates, wherein each said mounting plate comprises a connecting block, grooves allowing the positioning pins to be clamped therein are formed in the connecting blocks, and contacts are disposed on two sides of the grooves; and a base comprising a base support, wherein a rotary knob is disposed on the base support.

Furthermore, the base further comprises a connecting piece connected to the main light through a first fastener, and the base support is connected to the connecting piece through the rotary knob.

Furthermore, each said side light assembly further comprises an adjusting lever and a side light hinged to the adjusting lever.

Furthermore, cable boxes and USB cables received in the cable boxes and electrically connected to the side lights are disposed on the side lights.

Furthermore, switch buttons are disposed on the side lights.

Furthermore, magnets are disposed on the connecting blocks.

Furthermore, each said mounting plate comprises a second connecting piece connected to an adjusting lever through a second fastener, and the adjusting lever is able to rotate with respect to the second connecting piece.

Furthermore, a handle is disposed at an upper end of the connecting frame, and a control button is disposed on the handle.

Furthermore, a power display, a charging interface and a USB interface are disposed on the main light.

A control circuit of the portable LED spotlight, comprising a signal detection module including a main light signal detection circuit for detecting a preset input signal and generating a corresponding charging control signal and/or lighting control signal, and a side light signal detection circuit for receiving the lighting signal and controlling a working condition of the side lights according to the lighting control signal;

a charging management module connected to the signal detection module and used for receiving the charging control signal sent by the signal detection module and charging a battery in the spotlight according to the charging control signal;

a switch module connected to the main light detection circuit and used for controlling the main light to be turned on or off according to the lighting control signal of the main light detection circuit; and a USB interface module connected to the signal detection module and used for outputting power from the battery in the spotlight.

Furthermore, the main light signal detection circuit comprises a first detection chip IC1, a first diode D1, a second diode D2, a resistor R16, a resistor R26, a resistor R18, a resistor R19, a resistor R29 and a key S1;

Furthermore, a third pin P3 of the first detection chip IC1 is connected to one terminal of the resistor R16, an anode of the first diode D1 and an anode of the second diode D2 are connected to another terminal of the resistor R16, a cathode of the first diode D1 and a cathode of the second diode D2 are electrically connected to the charging management module, a fifth pin P5 of the first detection chip IC1 is electrically connected to the charging management module through the resistor R26, a ninth pin P9 of the first detection chip IC1 is electrically connected to the USB interface module through the resistor R28, the tenth pin P10 of the first detection chip IC1 is also electrically connected to one terminal of the key S1 through the resistor R29, another terminal of the key S1 is grounded, an eighth pin P8 of the first detection chip IC1 is electrically connected to the switch module, an eleventh pin Vss of the first detection chip IC1 is grounded, a thirteenth pin P13 of the first detection chip IC1 is electrically connected to the USB interface module, a fourteenth pin P14 of the first detection chip IC1 is electrically connected to one terminal of the resistor R18 and one terminal of the resistor R19, another terminal of the resistor R18 is connected to the charging management module, and another terminal of the resistor R19 is grounded.

Furthermore, The control circuit of the portable LED spotlight according to claim 10, wherein the main light signal detection circuit further comprises a resistor R24, a resistor R27, a first light-emitting diode, a second light-emitting diode, a third light-emitting diode and a fourth light-emitting diode; a cathode of the first light-emitting diode and a cathode of the second light-emitting diode are electrically connected to a sixth pin P6 of the first detection chip IC1, a cathode of the third light-emitting diode and a cathode of the fourth light-emitting diode are electrically connected to a seventh pin P7 of the first detection chip IC1, an anode of the first light-emitting diode and an anode of the third light-emitting diode are electrically connected to a tenth pin P10 of the first detection chip IC1 through the resistor R24, and an anode of the second light-emitting diode and an anode of the fourth light-emitting diode are electrically connected to a ninth pin P9 of the first detection chip IC1 through the resistor R27.

Furthermore, the control circuit of the portable LED spotlight, further comprising a signal transmission module for sending the charging control signal generated by the main light signal detection circuit to the charging management module and sending the lighting control signal generated by the main light signal detection circuit to the side light signal detection circuit.

A signal transmission module comprises a resistor R15, a first triode Q1, a resistor R21, a resistor R25, a third triode Q3, a resistor R30, a fourth triode Q4, a resistor R32, a resistor R33, a fifth triode Q5, a pin header DCSIN1 and a pin header DCSIN2, wherein an emitter of the first triode Q1 is electrically connected to the charging management module, a base of the first triode Q1 is electrically connected to one terminal of the resistor R21, the other terminal of the resistor R21 is electrically connected to a collector of the third triode Q3, the resistor R15 is electrically connected between the base and emitter of the first triode Q1, a collector of the first triode Q1 is connected to the charging management module and a port 2 of the pin header DCSIN1, a base of the third triode Q3 is electrically connected to the first pin P1 of the first detection chip IC1 in the signal detection module through the resistor R25, an emitter of the fourth triode Q4 is electrically connected to the charging management module, a base of the fourth triode Q4 is electrically connected to one terminal of the resistor R32, the other terminal of the resistor R32 is electrically connected to a collector of the fifth triode Q5, the resistor R30 is electrically connected between the base and the emitter of the fourth triode Q4, the collector of the fourth triode Q4 is connected to the charging management module and a port 2 of the pin header DCSIN2, a base of the fifth triode Q5 is electrically connected to the first pin P1 of the first detection chip IC1 in the signal detection module through the resistor R33, and a port 1 of the pin header DCSIN1 and a port 1 of the pin header DCSIN2 are grounded.

Furthermore, the side light signal detection circuit comprises a second detection chip IC2, a resistor R41, a resistor R45, a key S2, a capacitor C17, a resistor R46, an eighth MOS transistor Q8, a resistor R42, a resistor R43, a resistor R44 and a light-emitting diode LED2, a first pin of the second detection chip IC2 is connected to one terminal of the resistor R41, another terminal of the resistor R41 is electrically connected to the charging management module, the first pin of the second detection chip IC2 is also eclectically connected to an eighth pin of the second detection chip IC2 through the capacitor C17, a second pin of the second detection chip IC2 is electrically connected to the charging management module, a fifth pin of the second detection chip IC2 is connected to one terminal of the resistor R46 and a gate of the eighth MOS transistor Q8, another terminal of the resistor R46 and a source of the eighth MOS transistor Q8 are grounded, a drain of the eighth MOS transistor Q8 is connected to one terminal of the resistor R42, another terminal of the resistor R42 is connected to a cathode of the light-emitting diode LED2, an anode of the light-emitting diode LED2 is connected to the charging management module, the resistor 43 is connected to the two terminals of the resistor R42 in parallel, the resistor R44 is connected to two terminals of the resistor R43 in parallel, a sixth pin of the second detection chip IC2 is electrically connected to the charging management module, a seventh pin of the second detection chip IC2 is electrically connected to one terminal of the resistor R45 and one terminal of the key S2, another terminal of the resistor R45 is electrically connected to a first pin of the second detection chip IC2, and another terminal of the key S2 is grounded.

Furthermore, the charging management module comprises a main light charging management circuit and a side light charging management circuit, the main light charging management circuit comprises a first charging management chip U2, a resistor R1, a resistor R2, a resistor R5, a capacitor C1, a capacitor C2, a capacitor C3, a capacitor C4, an interface MICROUSB1, a resistor R12, a resistor R13, an inductor L1, a resistor R9, a capacitor C9, a capacitor C5, a capacitor C8, a capacitor C6, a capacitor C7 and a pin header BT1, a first pin the first charging management chip U2 is connected to one terminal of the resistor R5, another terminal of the resistor R5 is connected to one terminal of the capacitor C4, another terminal of the capacitor C4 is grounded, the first pin of the first charging management chip U2 is grounded through the capacitor C3, the capacitor C2 is connected to two terminals of the capacitor C3 in parallel, the first pin of the first charging management chip U2 is also electrically connected to an emitter of the first triode Q1 and an emitter of a fourth triode Q4 in the signal transmission module through the resistor R2, the terminal, electrically connected to the signal transmission module, of the resistor R2 is also connected to a port 1 of the interface MICROUSB1, a port 2 of the interface MICROUSB1 is grounded, the capacitor C1 is connected between the port 1 and the port 2 of the interface MICROUSB1, a second pin of the first charging management chip U2 is connected to one terminal of the resistor R12, another terminal of the resistor R12 is electrically connected to the fifth pin P5 of the first detection chip IC1 in the signal detection module through the resistor R26, the terminal, connected to the signal detection module, of the resistor R12 is grounded through the resistor R13, a third pin of the first charging management module U2 is connected to a battery pack through the resistor R1, an eighth pin of the first changing management chip U2 is connected to the USB interface module, a seventh pin of the first charging management chip U2 is connected to one terminal of the inductor L1, another terminal of the inductor L1 is connected to one terminal of the resistor R9, another terminal of the resistor R9 is connected to the capacitor C9, another terminal of the capacitor C9 is grounded, the terminal, connected to the capacitor C9, of the resistor R9 is also connected to a sixth pin of the first charging management chip U2, the terminal, connected to the resistor R9, of the inductor L1 is also connected to the capacitor C5, another terminal of the capacitor C5 is grounded, the capacitor C8 is connected to the two terminals of the capacitor C5 in parallel, the capacitor C6 is connected to two terminals of the capacitor C8 in parallel, the capacitor C7 is connected to two terminals of the capacitor C6 in parallel, the terminal, connected to the resistor R9, of the inductor L1 is also connected to the battery pack and a port 2 of the pin header BT1, and a port 1 of the pin header BT1 is grounded.

Furthermore, the side light charging management circuit comprises a resistor R34, a resistor R37, a resistor R35, a resistor R40, a seventh triode Q7, a sixth MOS transistor Q6, a capacitor C15, a resistor R36, a red-green light-emitting diode RGLED1, a resistor R38, a second charging management chip U3, a capacitor C16, a battery BT2, a diode D3 and a resistor R50, a fourth pin of the second charging management chip U3 is connected to one terminal of the resistor R36, another terminal of the resistor R36 is connected to a port 1 of the red-green light-emitting diode RGLED1, a port 2 of the red-green light-emitting diode RGLED1 is connected to a fifth pin of the second charging management chip U3 and a first pin of the second charging management chip U3, the terminal, connected to the second charging management chip U3, of the resistor R36 is also connected to one terminal of the capacitor C15, another terminal of the capacitor C15 is grounded, the fourth pin of the second charging management chip U3 is also connected to an anode of the diode D3, a cathode of the diode D3 is connected to one terminal of the resistor R50, another terminal of the resistor R50 is connected to a third pin of the second charging management chip U3, a sixth pin of the second charging management chip U3 is grounded through the resistor R38, a second pin of the second charging management chip U3 is grounded, the third pin of the second charging management chip U3 is connected to one terminal of the capacitor C16, another terminal of the capacitor C16 is grounded, an anode of the battery BT2 is connected to a third pin of the second charging management chip U3 a cathode of the battery BT2 is grounded, the anode of the battery BT2 is also electrically connected to the first pin of the second detection chip IC2 through the resistor R41 in the side light signal detection circuit, one terminal of the resistor R34 is connected the collector of the first triode Q1 in the signal transmission module and a source of the sixth MOS transistor Q6, another terminal of the resistor R34 is connected to the collector of the fourth triode Q4 in the signal transmission module and one terminal of the resistor R37, another terminal of the resistor R37 is grounded, a gate of the sixth MOS transistor Q6 is connected to one terminal of the resistor R39, another terminal of the resistor R39 is connected to a collector of the seventh third triode Q7, a base of the seventh triode Q7 is electrically connected to the sixth pin of the second detection chip IC2 in the side light signal detection circuit through the resistor R40, an emitter of the seventh triode Q7 is grounded, the resistor R35 is connected between the gate and the source of the sixth MOS transistor, and a drain of the sixth MOS transistor Q6 is electrically connected to the fourth pin of the second charging management chip U3.

Furthermore, the USB interface module comprises a capacitor C10, a capacitor C11, a capacitor C12, a resistor R22, a resistor R23, a capacitor C14, a first USB interface USB1, a second USB interface USB2, a resistor R14, a second triode Q2, a resistor R17 and a resistor R20, wherein a port 1 of the first USB interface USB1 and a port 1 of the second USB interface USB2 are electrically connected to one terminal of the capacitor C12, the other terminal of the capacitor C12 is grounded, the capacitor C11 is connected to two terminals of the capacitor C12 in parallel, the capacitor C10 is connected to two terminals of the capacitor C11 in parallel, the port 1 of the first USB interface USB1 and the port 1 of the second USB interface USB2 are connected to an eighth pin of the first charging management chip U2 in the main light charging management circuit, a port 2 and a port 3 of the first USB interface USB1 are connected, a port 2 and a port 3 of the second USB interface USB2 are connected, a port 4 of the first USB interface USB1 and a port 4 of the second USB interface USB2 are connected to one terminal of the resistor R22, the other terminal of the resistor R22 is grounded, the port 4 of the first USB interface USB1 and the port 4 of the second USB interface USB2 are electrically connected one terminal of the resistor R23, the other terminal of the resistor R23 is connected to one terminal of the capacitor C14, the other terminal of the capacitor C14 is grounded, the terminal, connected to the resistor R23, of the capacitor C14 is also connected to a thirteenth pin of the first detection chip IC1 in the main light signal detection circuit, one terminal of the resistor R14 is connected to a battery pack, the other terminal of the resistor R14 is connected to a base of the second triode Q2, a collector of the second triode Q2 is connected to one terminal of the resistor R17, the other terminal of the resistor R17 is connected to a ninth pin of the first detection chip IC1 in the main light signal detection circuit through the resistor R28, the terminal, connected to the first detection chip IC1, of the resistor R17 is grounded through the resistor R20, and an emitter of the second triode Q2 is connected to an eighth pin of the first charging management chip U2 in the main light charging management circuit.

Furthermore, the switch module comprises a pin header LED1, a resistor R3, a resistor R4, a resistor R6, a resistor R8, a resistor R11, a resistor R7, a resistor R10 and a first MOS transistor U1, wherein a first pin and a third pin of the first MOS transistor U1 are grounded, a second pin of the first MOS transistor U1 is grounded through the resistor R10, a fourth pin of the first MOS transistor U1 is connected to an eighth pin of the first detection chip IC1 in the main light signal detection circuit through the resistor R7, a fifth pin of the first MOS transistor U1 is connected to a port 2 of the pin header LED1 through the resistor R8, a sixth pin of the first MOS transistor U1 is connected to the port 2 of the pin header LED1 through the resistor R8, a seventh pin of the first MOS transistor U1 is connected to the port 2 of the pin header LED1 through the resistor R8, an eighth pin of the first MOS transistor U1 is connected to the port 2 of the pin header LED1 through the resistor R8, the resistor R6 is connected to two terminals of the resistor R8 in parallel, the resistor R4 is connected to two terminals of the resistor R6 in parallel, the resistor R3 is connected to two terminals of the resistor R4 in parallel, the resistor R11 is connected to two terminals of the resistor R8 in parallel, a port 1 of the pin header LED1 is connected to the battery pack, a fifth pin and a sixth pin of the first MOS transistor U1 are connected, and a seventh pin and an eighth pin of the first MOS transistor U1 are connected.

Compared with the prior art, the invention has at least the following beneficial effects:

(1) When the main light is charged through the charging interface, the side lights can also be charged through the charging interface; when the spotlight is used for lighting, the lights can be controlled in unified manner through the control button on the main light, so lighting can be realized without turning on the switch button on each light;

(2) The position of the connecting piece with respect to the base support can be adjusted through the rotary knob to adjust the lighting direction of the main light so as to ensure that the spotlight has a wider lighting range;

(3) A user can press the control button to adjust the light by using the main light and the side lights synchronously or separately; and when the side light assemblies are detached from the connecting frame, the side lights can be charged separately through the USB cables on the sidelights, and the side lights can be used for lighting independently through the switch buttons on the side lights;

(4) The side light assemblies can be attracted to required positions through magnets to be used for lighting separately;

(5) According to the control circuit of the portable spotlight, when the user charges the battery pack, the battery in the side light charging management circuit can also be charged through the circuit; when the spotlight is used for lighting, unified control is adopted, so that lighting can be realized without turning on the switch button on each light;

(6) According to the control circuit of the portable spotlight, the user can press the control button to adjust the light by using the main light and the side lights synchronously or separately;

(7) According to the control circuit of the portable spotlight, the key S2 can be pressed to enable the side lights to receive a control signal, the light intensity of the side lights is controlled, and the side lights can be used as required by the user when separated from the main light.

(8) According to the control circuit of the portable spotlight, the USB interface module is configured to allow the battery pack to output a 5V voltage, so that the user can charge other devices such as mobile phones through the USB interface.

In the FIGs: 1, main light; 11, USB interface; 12, power display; 13, charging interface; 2, connecting frame; 21, slot; 22, positioning pin; 3, side light assembly; 31, adjusting lever; 32, mounting plate; 321, groove; 322, contact; 323, second connecting piece; 324, connecting block; 325, magnet; 33, side light; 34, cable box; 35, switch button; 4, base; 41, rotary knob; 42, connecting piece; 43, base support; 5, handle; 6, control button.

DETAILED DESCRIPTION OF THE EMBODIMENTS

The technical solution of the invention is further described below in conjunction with the fowling specific embodiments and accompanying drawings of the invention. Clearly, the invention is not limited to these embodiments.

Embodiment 1

This embodiment provides a portable LED spotlight.

Figure 1:
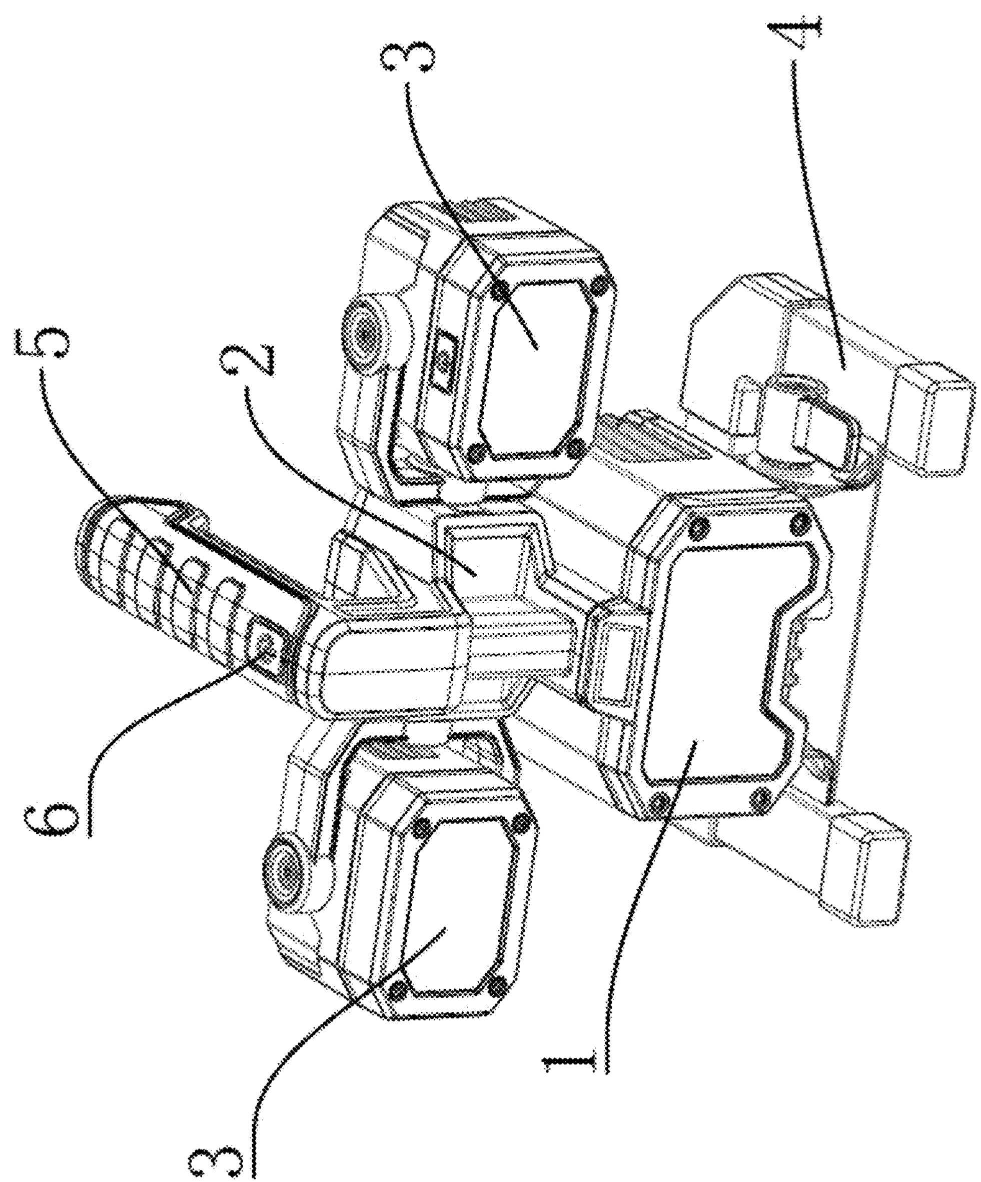
FIG. 1 is a perspective view of an embodiment of the invention.
Figure 2:
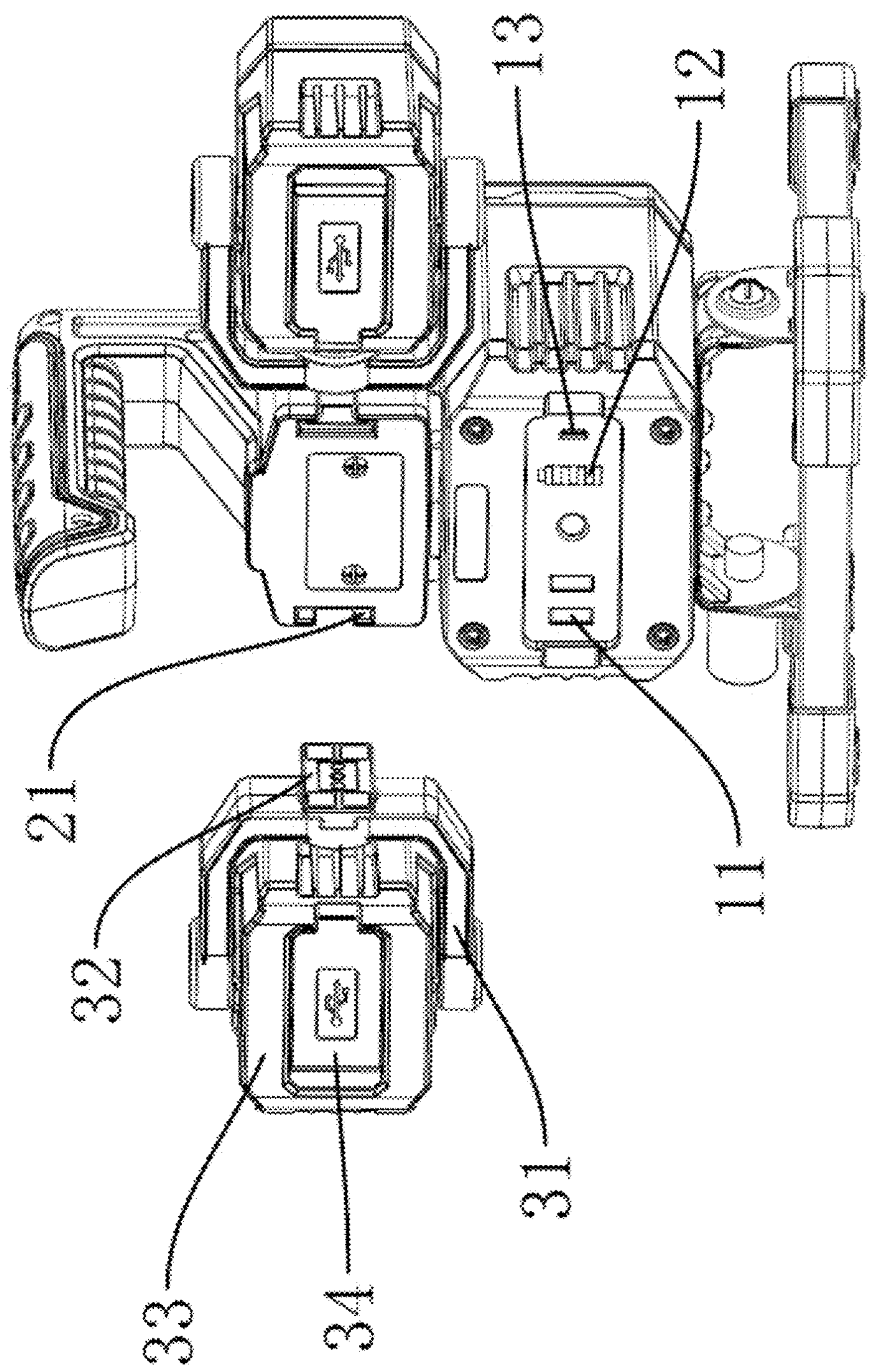
FIG. 2 is an exploded view of the embodiment of the invention.
Figure 3:
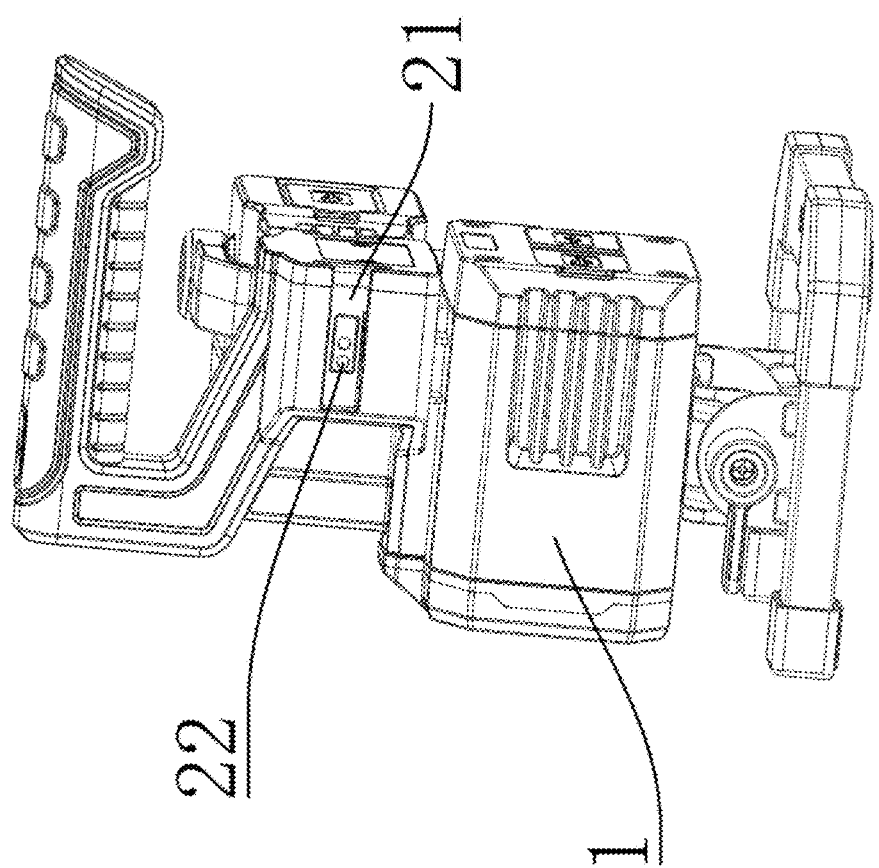
FIG. 3 is a structural view of an embodiment of the invention.
Figure 4:
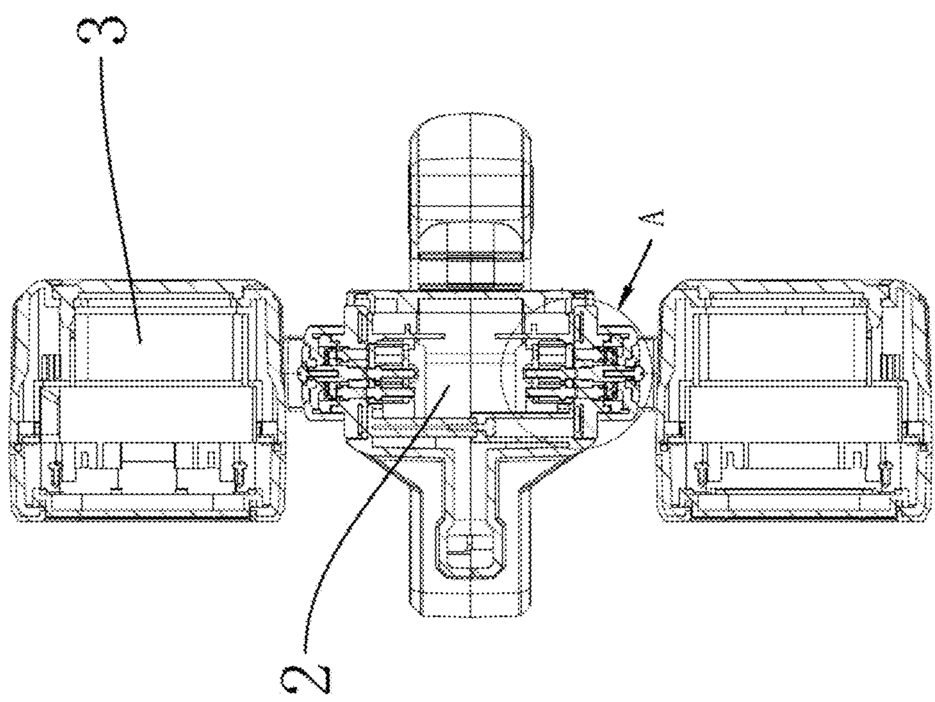
FIG. 4 is a sectional view of the embodiment of the invention.
Figure 5:
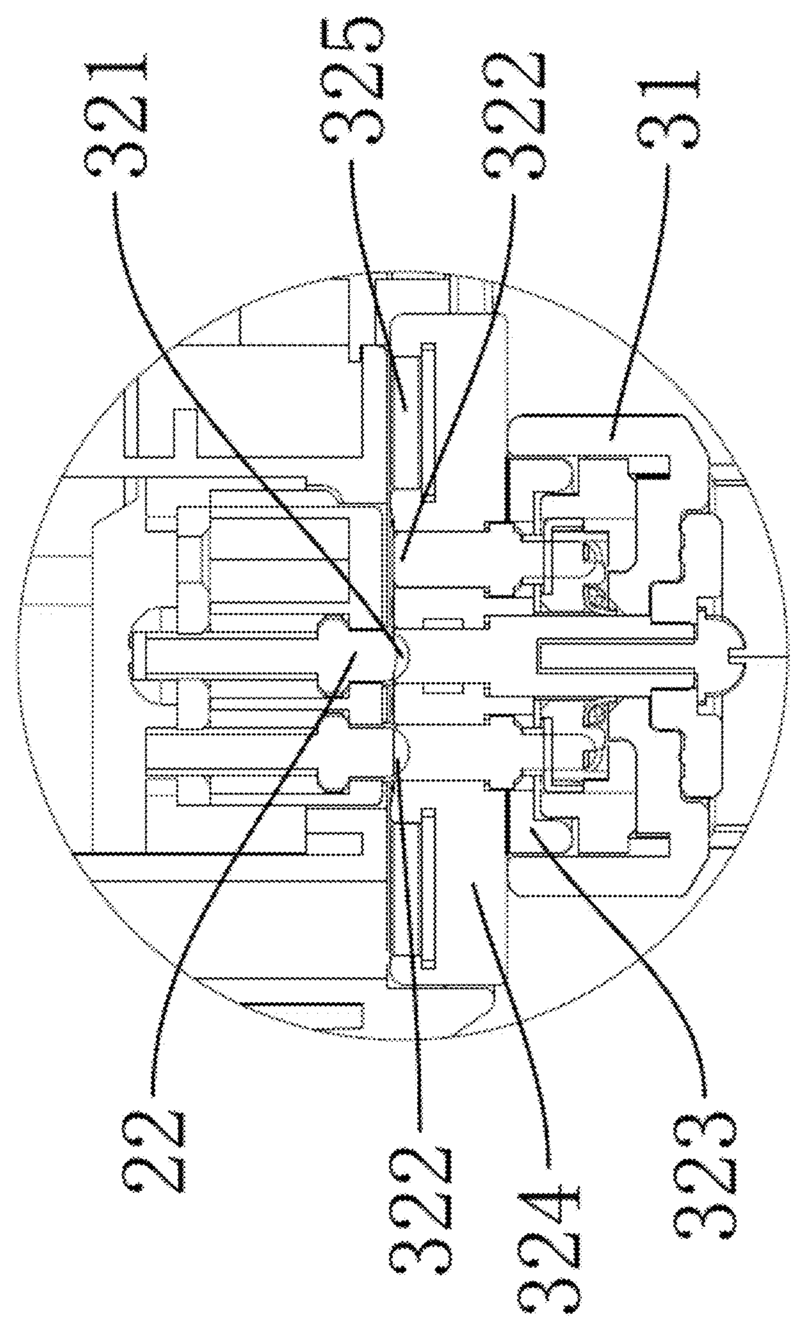
FIG. 5 is an enlarged view of part A in FIG. 4.
Figure 6:
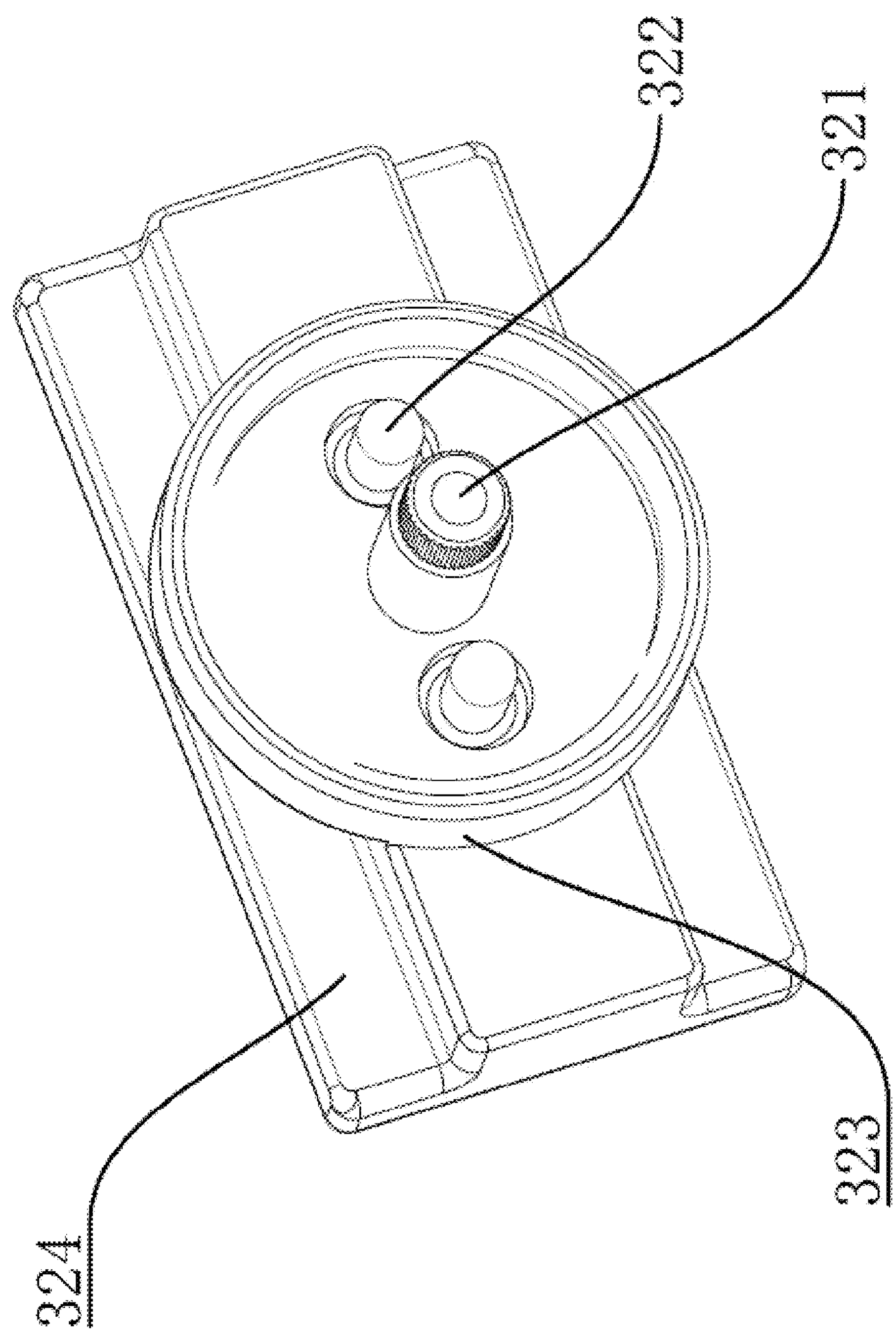
FIG. 6 is a perspective view of a mounting plate in the embodiment of the invention.
Figure 7:
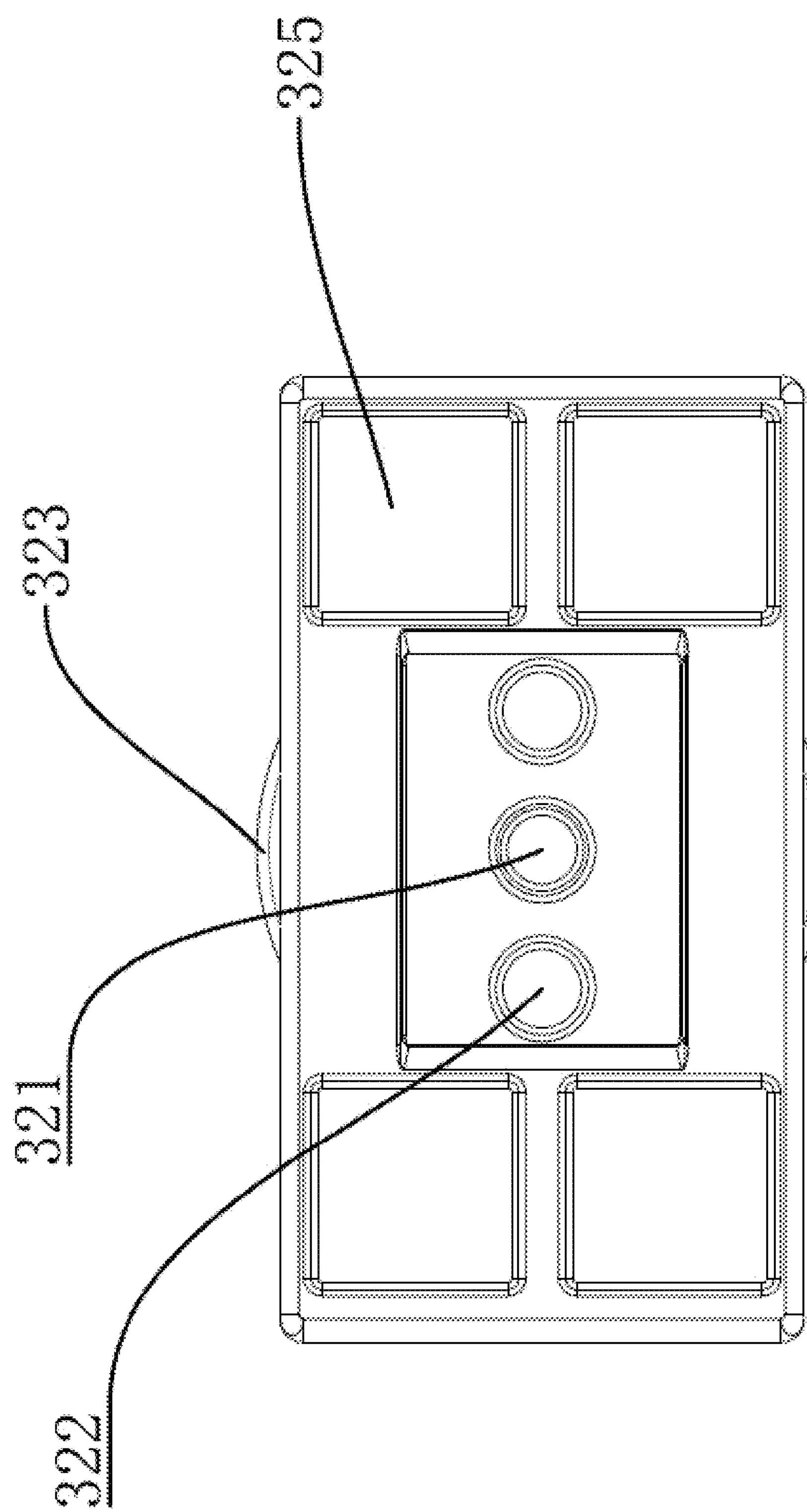
FIG. 7 is a front view of the mounting plate in the embodiment of the invention.

As shown in FIG. 1 to FIG. 3, the portable LED spotlight of the invention comprises a main light 1, a connecting frame 2, side light assemblies 3 and a base 4.

A power display 11 and a USB interface 12 are disposed on the main light 1, the remaining power of the spotlight can be checked through the power display 11 on the main light 1, and the spotlight can charge external devices such as mobile phones through the USB interface 12.

The connecting frame 2 is disposed above the main light 1, slots 21 are formed in two sides of the connecting frame 2, positioning pins 22 are disposed at bottoms of the slots 21, a handle 5 is disposed at the upper end of the connecting frame 2, and a control button 6 is disposed on the handle.

Mounting plates 32 matched with the slots 21 are disposed on the side light assemblies 3, and the side light assemblies 3 are connected to the connecting frame 2 through the mounting plates 32. Each side light assembly 3 further comprises an adjusting lever 31 and a side light 33 hinged to the adjusting lever 31, cable boxes 34 and USB cables received in the cable boxes 4 and electrically connected to the side lights are disposed on the side lights 3, and switch buttons 35 are disposed on the side lights 3. A user can press the control button 6 to adjust the light by using the main light 1 and the side lights 33 synchronously or separately; and when the side light assemblies 3 are detached from the connecting frame 2, the side lights can be charged separately through the USB cables on the sidelights 33, and the side lights can be used for lighting independently through the switch buttons 35 on the side lights 3.

As shown in FIG. 4 to FIG. 7, each mounting plate 32 comprises a connecting block 324, grooves 321 allowing the positioning pins 21 to be clamped therein are formed in the connecting blocks 324, and contacts 322 are disposed on two sides of the grooves 321.

Each mounting plate 32 further comprises a second connecting piece 323, the second connecting pieces 323 are connected to the adjusting levers 31 through fasteners, and the adjusting levers 31 are able to rotate with respect to the second connecting pieces 323.

The adjusting levers 31 can be rotated to enable the side lights 33 to rotate with respect to the connecting frame 2 in all directions, so that adjustment is convenient, and lighting can be realized in all directions.

Magnets 325 are disposed on the connecting blocks 324, and the side light assemblies 3 can be attracted to required positions through the magnets to be used for lighting separately.

Referring to FIG. 1 to FIG. 7, the specific operating process of the portable LED spotlight is as follows: the side light assemblies 3 are connected into the slots 21 in the connecting frame 2 through the connecting blocks 324 on the mounting plates 32 in such a manner that the grooves

321 and the contacts 322 on the two sides of the grooves 321 are exactly secured on the positioning pins 22 to ensure that the side light assemblies 3 and the connecting frame 2 are tightly connected, and the grooves 321 and the contacts 322 on the two sides of the grooves 321 are made of conductive materials to allow currents to pass through, so that when the main light is charged through the charging interface, the side lights can also be charged through the charging interface. When the spotlight is used for lighting, the lights can be controlled in unified manner through the control button on the main light, so lighting can be realized without turning on the switch button on each light.

Figure 8:
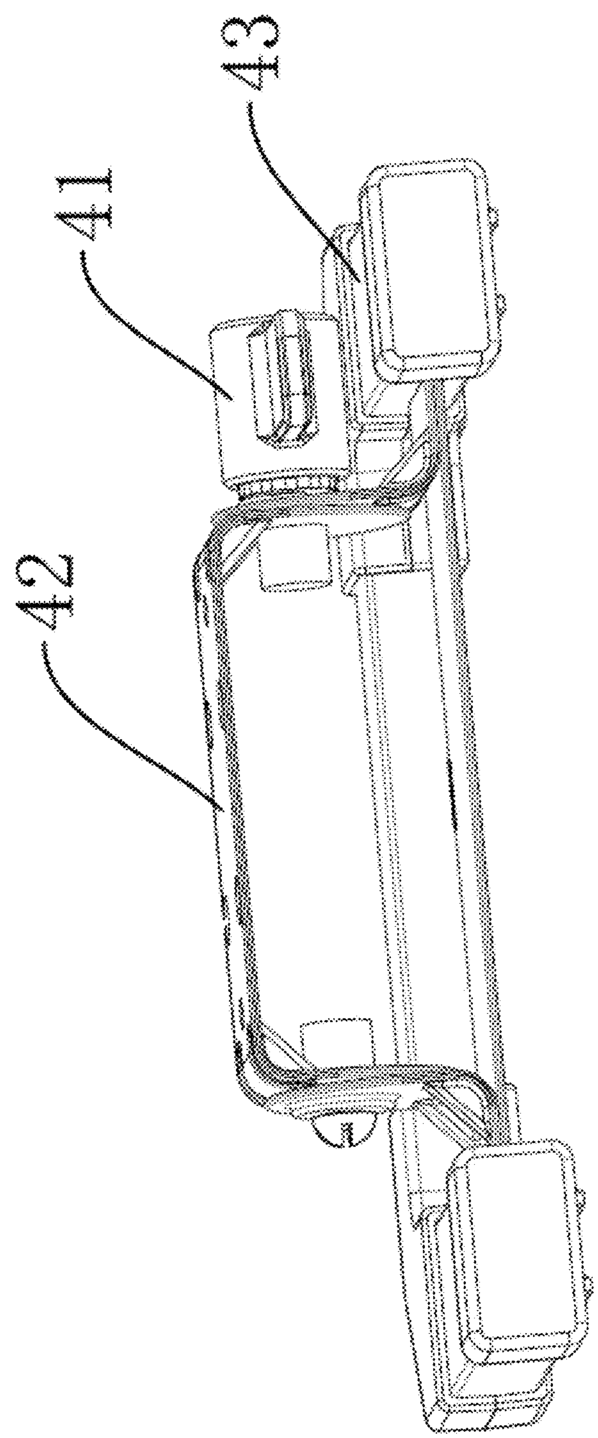
FIG. 8 is a perspective view of a base in the embodiment of the invention.

As shown in FIG. 8, the base 4 comprises a base support 43 and a connecting piece 42, wherein a rotary knob 42 is disposed on the base support 43, the connecting piece 42 is electrically connected to the main light 1 through a fastener, and the base support 43 is connected to the connecting piece 42 through the rotary knob 41.

The position of the connecting piece 42 with respect to the base support 43 can be adjusted through the rotary knob 41 to adjust the lighting direction of the main light 1 so as to ensure that the spotlight has a wider lighting range.

Embodiment 2

This embodiment provides a control circuit of a portable LED spotlight.

Figure 9:
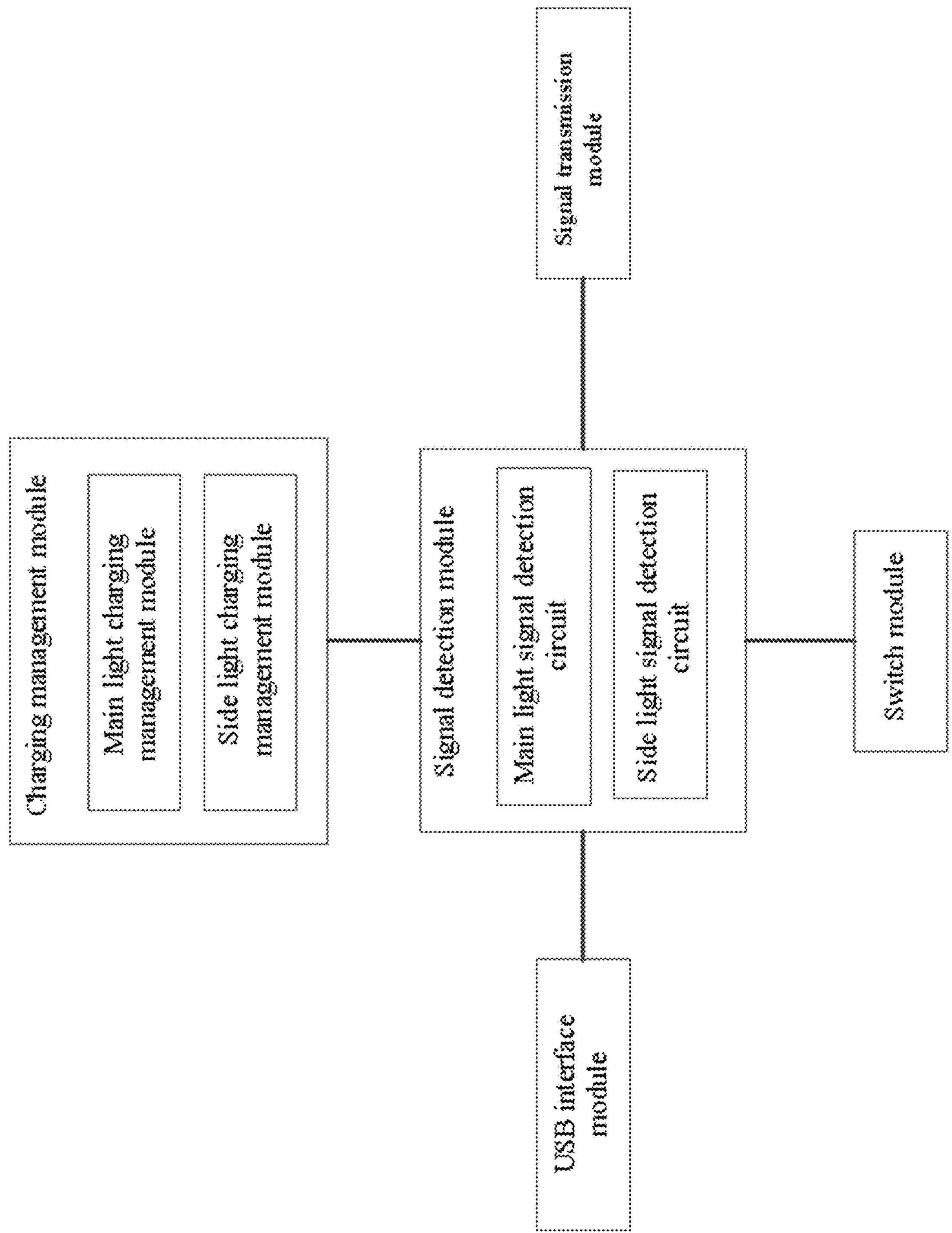
FIG. 9 is a structural view of the embodiment of the invention.

As shown in FIG. 9, the control circuit of the portable LED spotlight of the invention comprises a signal detection module, a signal transmission module, a charging management module, a USB interface module and a switch module, wherein the signal transmission module, the charging management module, the switch module and the USB interface module are connected to the signal detection module, the signal detection module comprises a main light signal detection circuit and a side light signal detection module, and the charging management module comprises a main light charging management circuit and a side light charging management circuit.

Figure 10:
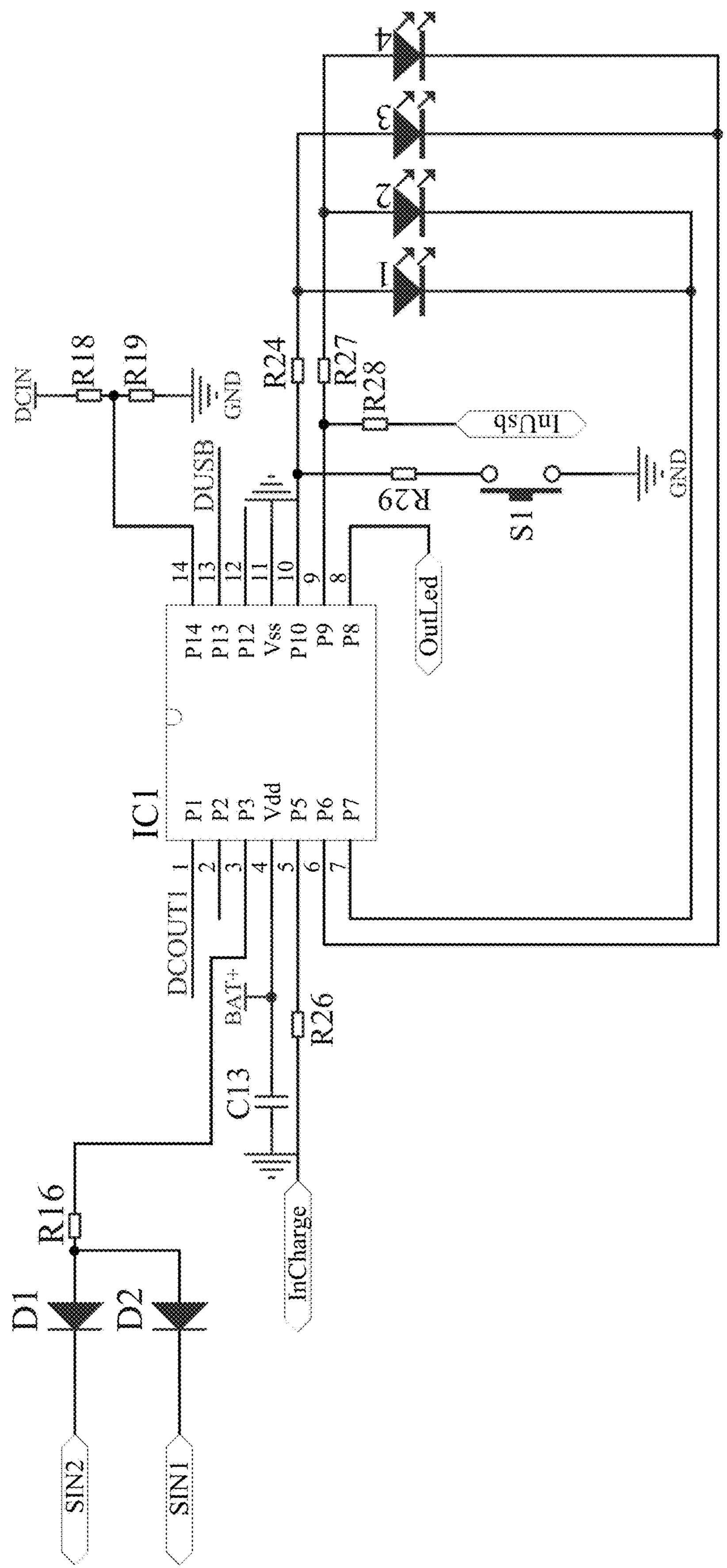
FIG. 10 is a circuit diagram of a main light signal detection circuit in the embodiment of the invention.

Specifically, as shown in FIG. 10, the main light signal detection circuit comprises a first detection chip IC1, a first diode D1, a second diode D2, a resistor R16, a capacitor C13, a resistor R26, a resistor R18, a resistor R19, a resistor R24, a resistor R27, a resistor R28, a resistor R29, a first light-emitting diode, a second light-emitting diode, a third light-emitting diode, a fourth light-emitting diode and a key S1;

A first pin P1 of the first detection chip IC1 is connected to the signal transmission module, a third pin P3 of the first detection chip IC1 is connected to one terminal of the resistor R16, an anode of the first diode D1 and an anode of the second diode D2 are connected to the other terminal of the resistor R16, a cathode of the first diode D1 and a cathode of the second diode D2 are electrically connected to the charging management module, a fourth pin Vdd of the first detection chip IC1 is electrically connected to one terminal of the capacitor C13 and a battery, the other terminal of the capacitor C13 is grounded, a fifth pin P5 of the first detection chip IC1 is electrically connected to the charging management module through the resistor R26, a cathode of the first light-emitting diode and a cathode of the second light-emitting diode are electrically connected to a sixth pin P6 of the first detection chip IC1, a cathode of the third light-emitting diode and a cathode of the fourth light-emitting diode are electrically connected to a seventh pin P7 of the first detection chip IC1, an anode of the first light-emitting diode and an anode of the third light-emitting diode are electrically connected to a tenth pin P10 of the first detection chip IC1 through the resistor R24, an anode of the second light-emitting diode and an anode of the fourth light-emitting diode are electrically connected to a ninth pin P9 of the first detection chip IC1 through the resistor R27, the ninth pin P9 of the first detection chip IC1 is also electrically connected to the USB interface module through the resistor R28, the tenth pin P10 of the first detection chip IC1 is also electrically connected to one terminal of the key S1 through the resistor R29, the other terminal of the key S1 is grounded, an eighth pin P8 of the first detection chip IC1 is electrically connected to the switch module, an eleventh pin Vss of the first detection chip IC1 is grounded, a thirteenth pin P13 of the first detection chip IC1 is electrically connected to the USB interface module, a fourteenth pin P14 of the first detection chip IC1 is electrically connected to one terminal of the resistor R18 and one terminal of the resistor R19, the other terminal of the resistor R18 is connected to the charging management module, and the other terminal of the resistor R19 is grounded.

When the key S1 is pressed (namely, the switch of the main light is pressed), the first detection chip IC1 outputs a series of protocol codes, which include a lead code and data information, through the third pin and then sends the protocol codes to the side light signal detection circuits through SIN2, a switch signal is sent to the switch module through the eighth pin of the first detection chip IC1, and the light intensity of the main light is controlled to change through the switch module.

Figure 11:
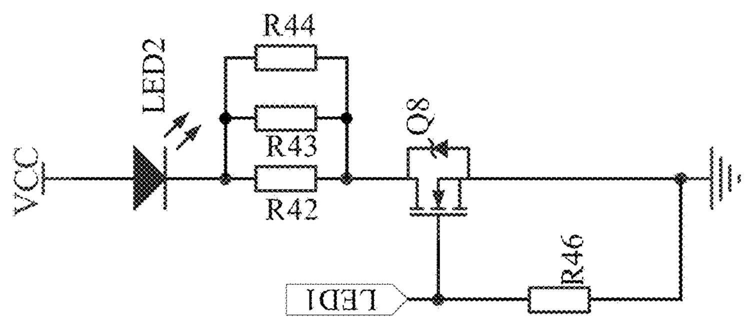
FIG. 11 is a circuit diagram of a side light signal detection circuit in the embodiment of the invention.
Figure 11:
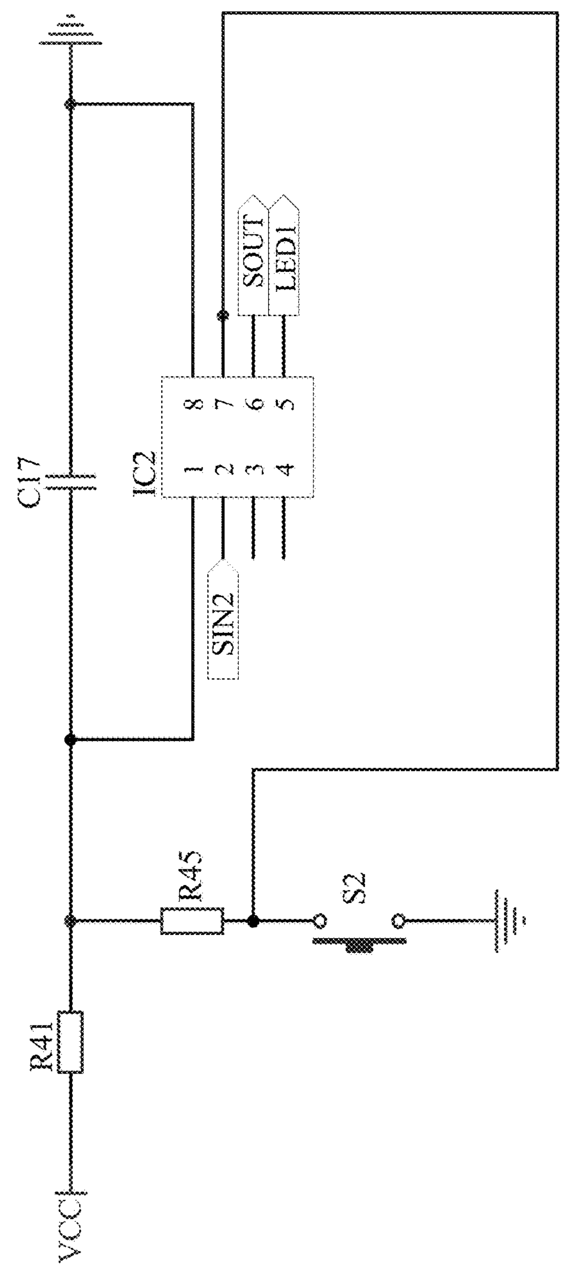

As shown in FIG. 11, the side light signal detection circuit comprises a second detection chip IC2, a resistor R41, a resistor R45, a key S2, a capacitor C17, a resistor R46, an eighth MOS transistor Q8, a resistor R42, a resistor R43, a resistor R44 and a light-emitting diode LED2, wherein a first pin of the second detection chip IC2 is connected to one terminal of the resistor R41, the other terminal of the resistor R41 is electrically connected to the charging management module, the first pin of the second detection chip IC2 is also eclectically connected to an eighth pin of the second detection chip IC2 through the capacitor C17, a second pin of the second detection chip IC2 is electrically connected to the charging management module, a fifth pin of the second detection chip IC2 is connected to one terminal of the resistor R46 and a gate of the eighth MOS transistor Q8, the other terminal of the resistor R46 and a source of the eighth MOS transistor Q8 are grounded, a drain of the eighth MOS transistor Q8 is connected to one terminal of the resistor R42, the other terminal of the resistor R42 is connected to a cathode of the light-emitting diode LED2, an anode of the light-emitting diode LED2 is connected to the charging management module, the resistor 43 is connected to the two terminals of the resistor R42 in parallel, the resistor R44 is connected to two terminals of the resistor R43 in parallel, a sixth pin of the second detection chip IC2 is electrically connected to the charging management module, a seventh pin of the second detection chip IC2 is electrically connected to one terminal of the resistor R45 and one terminal of the key S2, the other terminal of the resistor R45 is electrically connected to a first pin of the second detection chip IC2, and the other terminal of the key S2 is grounded.

The second pin of the second detection chip IC2 receives protocol codes sent from the first detection chip IC1 and calculates and judges the contents of the protocol codes; if the contents of the protocol codes include a lead code and data information, the second detection chip IC2 outputs a light-emitting instruction to the side lights in different modes according to the detected data information, then the light-emitting instruction is sent to the eighth MOS transistor Q8 through the fifth pin, and the eighth MOS transistor Q8 is controlled to be turned on to different degrees by controlling the current across the eighth MOS transistor Q8, so that lighting of different intensities is realized. For example, the main light and the two side lights are controlled to emit strong light; or, the main light and the two side lights are controlled to emit weak light; or, the main light is turned off, and the two side lights emit strong light; or, the main light and the side lights are all turned off.

In addition, the key S2 can be pressed to control the side lights to emit light of different intensities according to a control signal received by the second detection chip IC2, so that the side lights can be used as required by the user when separated from the main light.

Figure 12:
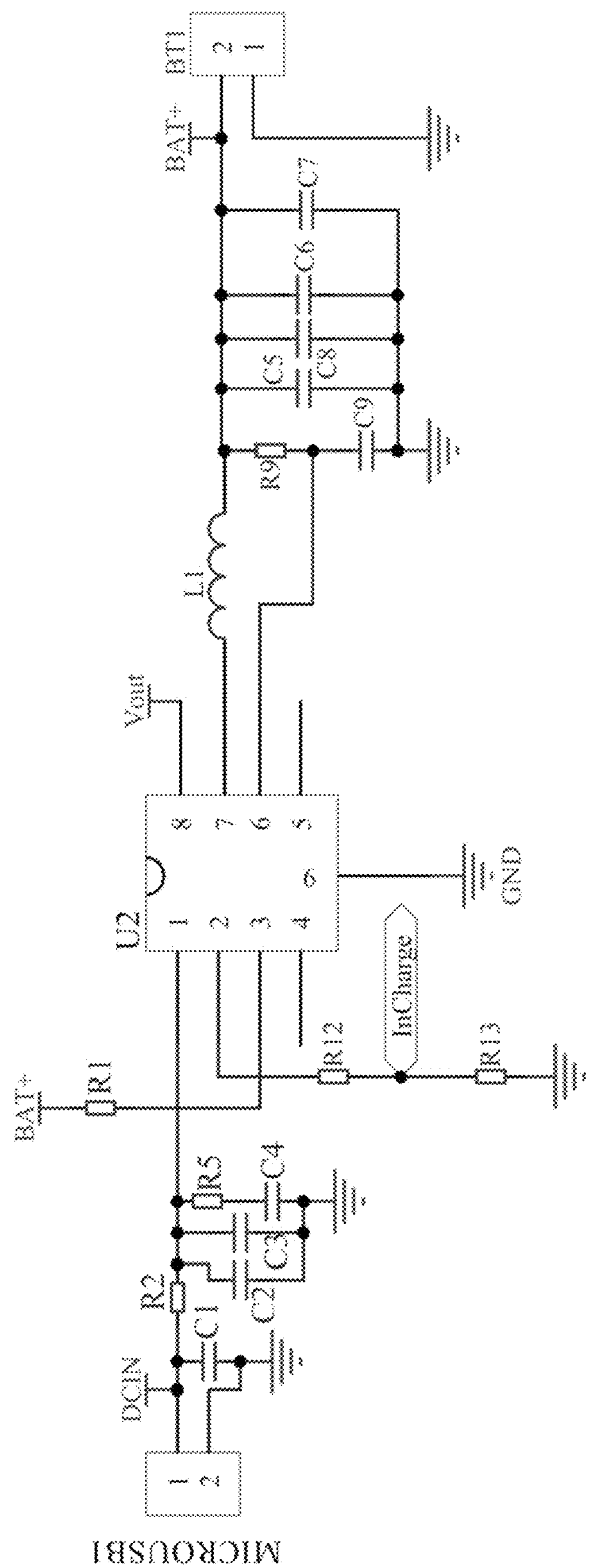
FIG. 12 is a circuit diagram of a main light charging management circuit in the embodiment of the invention.

As shown in FIG. 12, the main light charging management circuit comprises a first charging management chip U2, a resistor R1, a resistor R2, a resistor R5, a capacitor C1, a capacitor C2, a capacitor C3, a capacitor C4, an interface MICROUSB1, a resistor R12, a resistor R13, an inductor L1, a resistor R9, a capacitor C9, a capacitor C5, a capacitor C8, a capacitor C6, a capacitor C7 and a pin header BT1, wherein a first pin of the first charging management chip U2 is connected to one terminal of the resistor R5, the other terminal of the resistor R5 is connected to one terminal of the capacitor C4, the other terminal of the capacitor C4 is grounded, a first pin of the first charging management chip U2 is grounded through the capacitor C3, the capacitor C2 is connected to two terminals of the capacitor C3 in parallel, the first pin of the first charging management chip U2 is also electrically connected to an emitter of a first triode Q1 and an emitter of a fourth triode Q4 in the signal transmission module through the resistor R2, the terminal, electrically connected to the signal transmission module, of the resistor R2 is also connected to a port 1 of the interface MICROUSB1, a port 2 of the interface MICROUSB1 is grounded, the capacitor C1 is connected between the port 1 and the port 2 of the interface MICROUSB1, a second pin of the first charging management chip U2 is connected to one terminal of the resistor R12, the other terminal of the resistor R12 is electrically connected to the fifth pin P5 of the first detection chip IC1 in the signal detection module through the resistor R26, the terminal, connected to the signal detection module, of the resistor R12 is grounded through the resistor R13, a third pin of the first charging management module U2 is connected to the battery through the resistor R1, an eighth pin of the first changing management chip U2 is connected to the USB interface module, a seventh pin of the first charging management chip U2 is connected to one terminal of the inductor L1, the other terminal of the inductor L1 is connected to one terminal of the resistor R9, the other terminal of the resistor R9 is connected to the capacitor C9, the other terminal of the capacitor C9 is grounded, the terminal, connected to the capacitor C9, of the resistor R9 is also connected to a sixth pin of the first charging management chip U2, the terminal, connected to the resistor R9, of the inductor L1 is also connected to the capacitor C5, the other terminal of the capacitor C5 is grounded, the capacitor C8 is connected to the two terminals of the capacitor C5 in parallel, the capacitor C6 is connected to two terminals of the capacitor C8 in parallel, the capacitor C7 is connected to two terminals of the capacitor C6 in parallel, the terminal, connected to the resistor R9, of the inductor L1 is also connected to a battery pack and a port 2 of the pin header BT1, and a port 1 of the pin header BT1 is grounded.

Referring to FIG. 10 and FIG. 12, the battery pack is charged through the interface MICROUSB1, a charging signal is sent to the first charging management chip, and the second pin of the first charging management chip U2 sends charging information to the fifth pin of the first detection chip IP1; if the first detection chip IC1 determines, after calculation and judgment, that the signal is a charging signal, the first light-emitting diode, the second light-emitting diode, the third light-emitting diode and the fourth light-emitting diode will be controlled to emit light in a surging manner to prompt the user that the spotlight is being charged now, and a high-level voltage will be output through the first pin of the first detection chip IC1.

When the battery pack is fully charged, the fifth pin of the first detection chip IC1 will receive a charging signal sent from the main light charging management circuit; if the first detection chip IC1 determines, after calculation and judgment, that the battery pack is fully charged, the first light-emitting diode, the second light-emitting diode, the third light-emitting diode and the fourth light-emitting diode will be controlled to emit light to prompt the user that charging has been finished.

The main light charging management circuit outputs a 5V voltage to the signal transmission module through DCIN.

Figure 13:
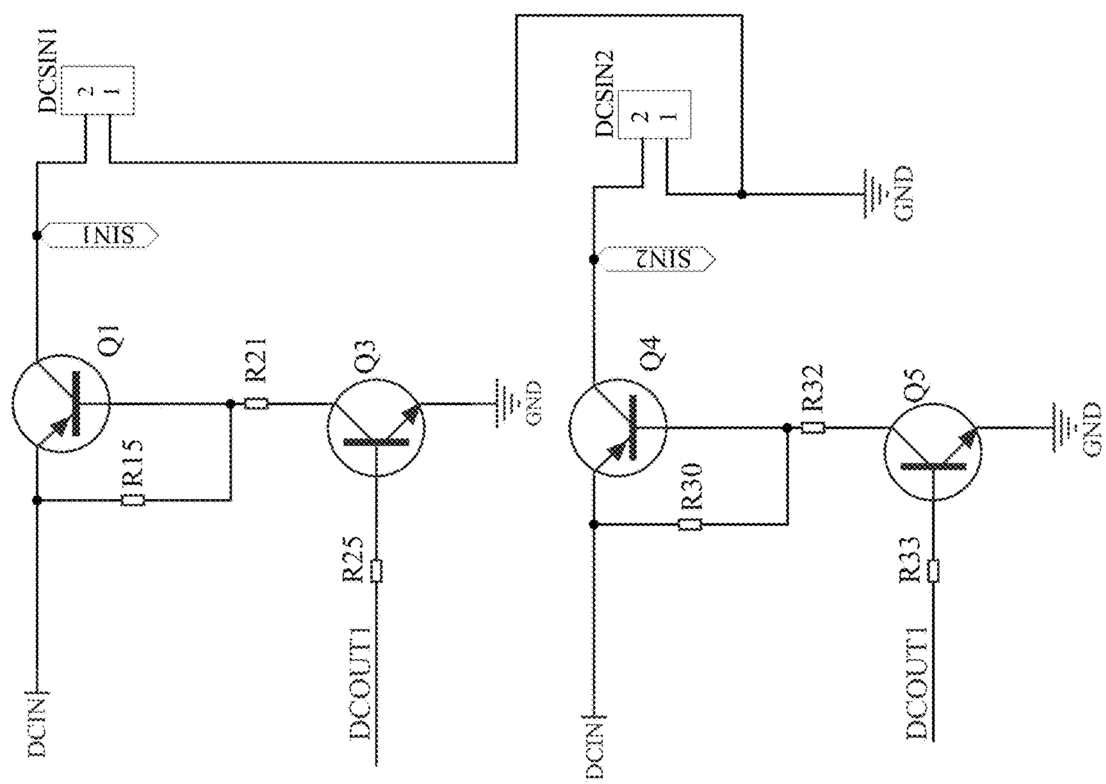
FIG. 13 is a circuit diagram of a signal transmission module in the embodiment of the invention.

As shown in FIG. 13, the signal output module comprises a resistor R15, a first triode Q1, a resistor R21, a resistor R25, a third triode Q3, a resistor R30, a fourth triode Q4, a resistor R32, a resistor R33, a fifth triode Q5, a pin header DCSIN1 and a pin header DCSIN2, wherein an emitter of the first triode Q1 is electrically connected to the charging management module, a base of the first triode Q1 is electrically connected to one terminal of the resistor R21, the other terminal of the resistor R21 is electrically connected to a collector of the third triode Q3, the resistor R15 is electrically connected between the base and emitter of the first triode Q1, a collector of the first triode Q1 is connected to the charging management module and a port 2 of the pin header DCSIN1, a base of the third triode Q3 is electrically connected to the first pin P1 of the first detection chip IC1 in the signal detection module through the resistor R25, an emitter of the fourth triode Q4 is electrically connected to the charging management module, a base of the fourth triode Q4 is electrically connected to one terminal of the resistor R32, the other terminal of the resistor R32 is electrically connected to a collector of the fifth triode Q5, the resistor R30 is electrically connected between the base and the emitter of the fourth triode Q4, the collector of the fourth triode Q4 is connected to the charging management module and a port 2 of the pin header DCSIN2, a base of the fifth triode Q5 is electrically connected to the first pin P1 of the first detection chip IC1 in the signal detection module through the resistor R33, and a port 1 of the pin header DCSIN1 and a port 1 of the pin header DCSIN2 are grounded.

Referring to FIG. 10, FIG. 12 and FIG. 13, the first triode Q1 and the fourth triode Q4 in the signal transmission module receive a voltage sent from the main light charging management circuit; after receiving the high-voltage voltage sent from the first detection chip IC1, the third triode Q3 and the fifth triode Q5 are turned on to allow the collector of the first triode Q1 and the collector of the fourth triode Q4 to obtain the high-level voltage, which is then sent to the side light charging management circuit and the side light signal detection circuit through SIN1 and SIN2.

Figure 14:
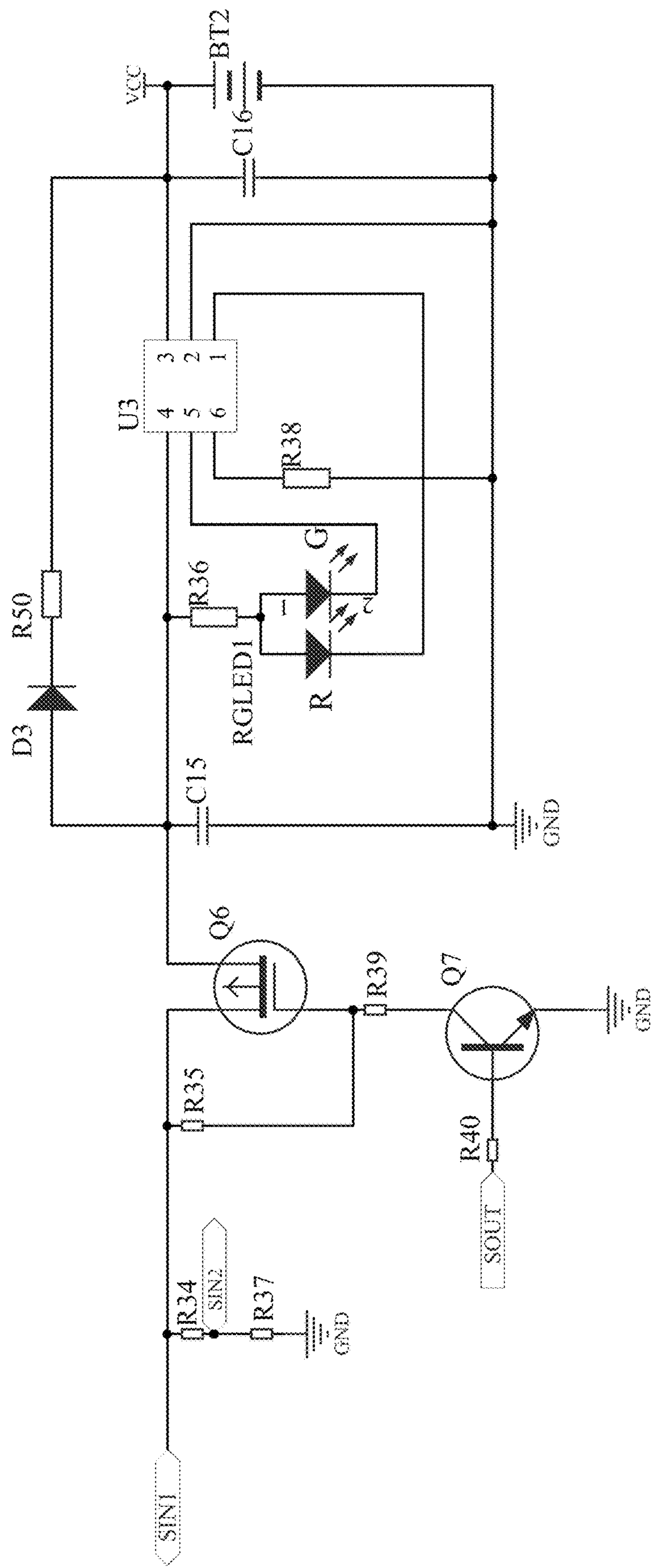
FIG. 14 is a circuit diagram of a side light charging management circuit in the embodiment of the invention.

As shown in FIG. 14, the side light charging management circuit comprises a resistor R34, a resistor R37, a resistor R35, a resistor R40, a seventh triode Q7, a sixth MOS transistor Q6, a capacitor C15, a resistor R36, a red-green light-emitting diode RGLED1, a resistor R38, a second charging management chip U3, a capacitor C16, a battery BT2, a diode D3 and a resistor R50, wherein a fourth pin of the second charging management chip U3 is connected to one terminal of the resistor R36, the other terminal of the resistor R36 is connected to a port 1 of the red-green light-emitting diode RGLED1, a port 2 of the red-green light-emitting diode RGLED1 is connected to a fifth pin of the second charging management chip U3 and a first pin of the second charging management chip U3, the terminal, connected to the second charging management chip U3, of the resistor R36 is also connected to one terminal of the capacitor C15, the other terminal of the capacitor C15 is grounded, the fourth pin of the second charging management chip U3 is also connected to an anode of the diode D3, a cathode of the diode D3 is connected to one terminal of the resistor R50, the other terminal of the resistor R50 is connected to a third pin of the second charging management chip U3, a sixth pin of the second charging management chip U3 is grounded through the resistor R38, a second pin of the second charging management chip U3 is grounded, the third pin of the second charging management chip U3 also is connected to one terminal of the capacitor C16, the other terminal of the capacitor C16 is grounded, an anode of the battery BT2 is connected to a third pin of the second charging management chip U3 and is also connected to an anode of the light-emitting diode LED2, a cathode of the battery BT2 is grounded, the anode of the battery BT1 is also electrically connected to the first pin of the second detection chip IC2 through the resistor R41 in the side light signal detection circuit, one terminal of the resistor R34 is connected the collector of the first triode Q1 in the signal transmission module and a source of the sixth MOS transistor Q6, the other terminal of the resistor R34 is connected to the collector of the fourth triode Q4 in the signal transmission module and one terminal of the resistor R37, the other terminal of the resistor R37 is grounded, a gate of the sixth MOS transistor Q6 is connected to one terminal of the resistor R39, the other terminal of the resistor R39 is connected to a collector of the seventh third triode Q7, a base of the seventh triode Q7 is electrically connected to the sixth pin of the second detection chip IC2 in the side light signal detection circuit, an emitter of the seventh triode Q7 is grounded, the resistor R35 is connected between the gate and the source of the sixth MOS transistor, and a drain of the sixth MOS transistor Q6 is electrically connected to the fourth pin of the second charging management chip U3.

Referring to FIG. 11 and FIG. 14, the second pin of the second detection chip IC2 in the side light signal detection circuit receives a high-level voltage sent from the signal transmission module; if the second detection chip IC2 detects that the duration of the high-level voltage is twice greater than that of the lead code, it is determined that a charging signal is received, a charging instruction is sent to the side light charging management circuit through the sixth pin of the second detection chip IC2 to turn on the seventh triode Q7 and then to turn on the sixth MOS transistor Q6, the high-level voltage from the signal transmission module is sent to the second charging management chip U3 through SIN1, and the battery BT2 is charged through the second charging management chip U3 to enable the red-green light-emitting diode RGLED1 to emit light; when the battery is charged, the red-green light-emitting diode RGLED1 emits red light; and when the battery is fully charged, the light-emitting diode RGLED1 emits green light.

When the main light charging management circuit charges the battery pack, a charging signal is sent to the side light charging management circuit through the signal transmission module, so that the battery in the side light charging management circuit can be charged at the same time.

Figure 15:
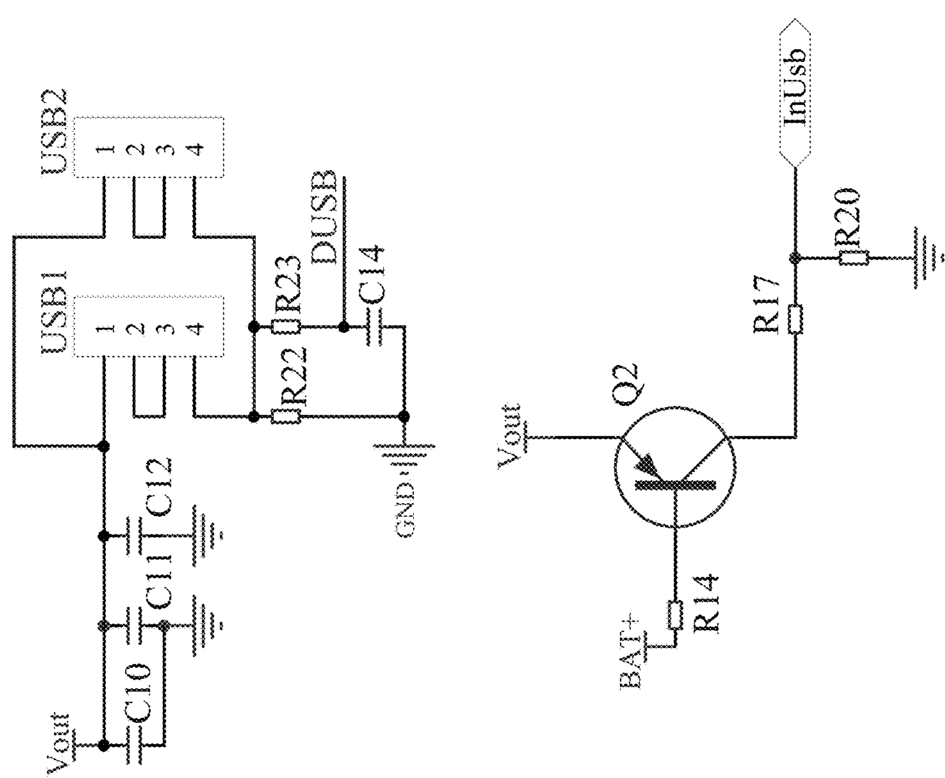
FIG. 15 is a circuit diagram of a USB interface module in the embodiment of the invention.

As shown in FIG. 15, the USB interface module comprises a capacitor C10, a capacitor C11, a capacitor C12, a resistor R22, a resistor R23, a capacitor C14, a first USB interface USB1, a second USB interface USB2, a resistor R14, a second triode Q2, a resistor R17 and a resistor R20, wherein a port 1 of the first USB interface USB1 and a port 1 of the second USB interface USB2 are electrically connected to one terminal of the capacitor C12, the other terminal of the capacitor C12 is grounded, the capacitor C11 is connected to two terminals of the capacitor C12 in parallel, the capacitor C10 is connected to two terminals of the capacitor C11 in parallel, the port 1 of the first USB interface USB1 and the port 1 of the second USB interface USB2 are connected to the eighth pin of the first charging management chip U2 in the main light charging management circuit, a port 2 and a port 3 of the first USB interface USB1 are connected, a port 2 and a port 3 of the second USB interface USB2 are connected, a port 4 of the first USB interface USB1 and a port 4 of the second USB interface USB2 are connected to one terminal of the resistor R22, the other terminal of the resistor R22 is grounded, the port 4 of the first USB interface USB1 and the port 4 of the second USB interface USB2 are electrically connected one terminal of the resistor R23, the other terminal of the resistor R23 is connected to one terminal of the capacitor C14, the other terminal of the capacitor C14 is grounded, the terminal, connected to the resistor R23, of the capacitor C14 is also connected to the thirteenth pin of the first detection chip IC1 in the main light signal detection circuit, one terminal of the resistor R14 is connected to the battery pack, the other terminal of the resistor R14 is connected to a base of the second triode Q2, a collector of the second triode Q2 is connected to one terminal of the resistor R17, the other terminal of the resistor R17 is connected to the ninth pin of the first detection chip IC1 in the main light signal detection circuit through the resistor R28, the terminal, connected to the first detection chip IC1, of the resistor R17 is grounded through the resistor R20, and an emitter of the second triode Q2 is connected to the eighth pin of the first charging management chip U2 in the main light charging management circuit.

Vout is a voltage output by the main light charging management circuit; after power is supplied by the battery pack, the second triode Q2 is turned on to allow the voltage output by the main light charging management circuit to be sent to the main light signal detection circuit, and the thirteenth pin of the first detection chip IC1 controls a voltage output of the USB interface module, so that a device such as mobile phone can be charged through the USB interface.

Figure 16:
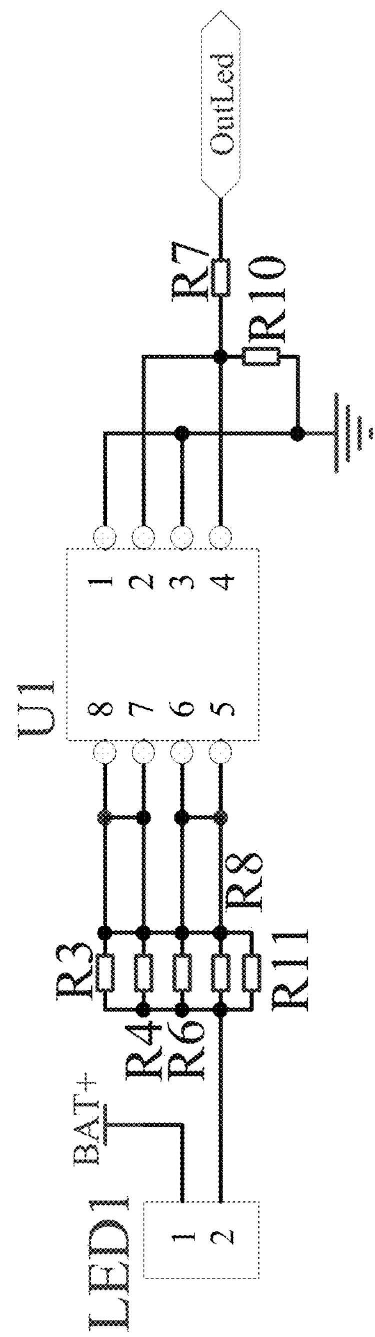
FIG. 16 is a circuit diagram of a switch module in the embodiment of the invention.

As shown in FIG. 16, the switch module comprises a pin header LED1, a resistor R3, a resistor R4, a resistor R6, a resistor R8, a resistor R11, a resistor R7, a resistor R10 and a first MOS transistor U1, wherein a first pin and a third pin of the first MOS transistor U1 are grounded, a second pin of the first MOS transistor U1 is grounded through the resistor R10, a fourth pin of the first MOS transistor U1 is connected to an eighth pin of the first detection chip IC1 in the main light signal detection circuit through the resistor R7 and is grounded through the resistor R10, a fifth pin of the first MOS transistor U1 is connected to a port 2 of the pin header LED1 through the resistor R8, a sixth pin of the first MOS transistor U1 is connected to the port 2 of the pin header LED1 through the resistor R8, a seventh pin of the first MOS transistor U1 is connected to the port 2 of the pin header LED1 through the resistor R8, an eighth pin of the first MOS transistor U1 is connected to the port 2 of the pin header LED1 through the resistor R8, the resistor R6 is connected to two terminals of the resistor R8 in parallel, the resistor R4 is connected to two terminals of the resistor R6 in parallel, the resistor R3 is connected to two terminals of the resistor R4 in parallel, the resistor R11 is connected to two terminals of the resistor R8 in parallel, a port 1 of the pin header LED1 is connected to the battery pack, a fifth pin and a sixth pin of the first MOS transistor U1 are connected, and a seventh pin and an eighth pin of the first MOS transistor U1 are connected.

The fourth pin of the first MOS transistor U1 in the switch module receives a switch signal sent from the first detection chip IC1, and the light intensity of the main light is controlled to change by controlling on-off of the first MOS transistor U1.

The specific embodiments described above are merely used to illustrate the spirit of the invention. Those skilled in the technical field can make various modifications, supplements or similar equivalents to the specific embodiments described above without deviating from the spirit of the invention or exceeding the scope defined by the appended claims.

What is claimed is:

1. A portable Light Emitting Diode (LED) spotlight, comprising:

a main light;

a connecting frame, wherein the connecting frame is disposed above the main light, slots are formed in two sides of the connecting frame, and positioning pins are disposed at bottoms of the slots;

side light assemblies provided with mounting plates, wherein the mounting plates are matched with the slots, the side light assemblies are connected to the connecting frame through the mounting plates, each of the mounting plates comprises connecting blocks, grooves are formed in the connecting blocks, the positioning pins are clamped in the grooves, and contacts are disposed on two sides of the grooves; and a base, wherein the base comprises a base support, and a rotary knob is disposed on the base support.

2. The portable LED spotlight according to claim 1, wherein the base further comprises a connecting piece connected to the main light through a first fastener, and the base support is connected to the connecting piece through the rotary knob.

3. The portable LED spotlight according to claim 1, wherein each of the side light assemblies further comprises an adjusting lever and a side light hinged to the adjusting lever.

4. The portable LED spotlight according to claim 3, wherein cable boxes and USB cables received in the cable boxes and electrically connected to the side lights are disposed on the side lights.

5. The portable LED spotlight according to claim 4, wherein switch buttons are disposed on the side lights.

6. The portable LED spotlight according to claim 1, wherein magnets are disposed on the connecting blocks.

7. The portable LED spotlight according to claim 1, wherein the each of the mounting plates comprises a second connecting piece connected to an adjusting lever through a second fastener, and the adjusting lever is able to rotate with respect to the second connecting piece.

8. The portable LED spotlight according to claim 1, wherein a handle is disposed at an upper end of the connecting frame, and a control button is disposed on the handle.

9. The portable LED spotlight according to claim 1, wherein a power display, a charging interface and a USB interface are disposed on the main light.

10. A control circuit of the portable LED spotlight according to claim 1, comprising a signal detection module, wherein the signal detection module comprises a main light signal detection circuit for detecting a preset input signal and generating a charging control signal and/or a lighting control signal, wherein the charging control signal and the lighting control signal correspond to the preset input signal, and a side light signal detection circuit for receiving a lighting signal and controlling a working condition of side lights according to the lighting control signal;

a charging management module, wherein the charging management module is connected to the signal detection module and used for receiving the charging control signal sent by the signal detection module and charging a battery in the portable LED spotlight according to the charging control signal;

a switch module, wherein the switch module is connected to the main light detection circuit and used for controlling the main light to be turned on or off according to the lighting control signal of the main light detection circuit; and a USB interface module, wherein the USB interface module is connected to the signal detection module and used for outputting power from the battery in the portable LED spotlight.

11. The control circuit of the portable LED spotlight according to claim 10, wherein the main light signal detection circuit comprises a first detection chip IC1, a first diode D1, a second diode D2, a resistor R16, a resistor R26, a resistor R18, a resistor R19, a resistor R29 and a key S1; wherein a third pin P3 of the first detection chip IC1 is connected to a first terminal of the resistor R16, an anode of the first diode D1 and an anode of the second diode D2 are connected to a second terminal of the resistor R16, a cathode of the first diode D1 and a cathode of the second diode D2 are electrically connected to the charging management module, a fifth pin P5 of the first detection chip IC1 is electrically connected to the charging management module through the resistor R26, a ninth pin P9 of the first detection chip IC1 is electrically connected to the USB interface module through the resistor R28, a tenth pin P10 of the first detection chip IC1 is also electrically connected to a first terminal of the key S1 through the resistor R29, a second terminal of the key S1 is grounded, an eighth pin P8 of the first detection chip IC1 is electrically connected to the switch module, an eleventh pin Vss of the first detection chip IC1 is grounded, a thirteenth pin P13 of the first detection chip IC1 is electrically connected to the USB interface module, a fourteenth pin P14 of the first detection chip IC1 is electrically connected to a first terminal of the resistor R18 and a first terminal of the resistor R19, a second terminal of the resistor R18 is connected to the charging management module, and a second terminal of the resistor R19 is grounded.

12. The control circuit of the portable LED spotlight according to claim 11, wherein the main light signal detection circuit further comprises a resistor R24, a resistor R27, a first light-emitting diode, a second light-emitting diode, a third light-emitting diode and a fourth light-emitting diode; wherein a cathode of the first light-emitting diode and a cathode of the second light-emitting diode are electrically connected to a sixth pin P6 of the first detection chip IC1, a cathode of the third light-emitting diode and a cathode of the fourth light-emitting diode are electrically connected to a seventh pin P7 of the first detection chip IC1, an anode of the first light-emitting diode and an anode of the third light-emitting diode are electrically connected to the tenth pin P10 of the first detection chip IC1 through the resistor R24, and an anode of the second light-emitting diode and an anode of the fourth light-emitting diode are electrically connected to the ninth pin P9 of the first detection chip IC1 through the resistor R27.

13. The control circuit of the portable LED spotlight according to claim 10, further comprising a signal transmission module for sending the charging control signal generated by the main light signal detection circuit to the charging management module and sending the lighting control signal generated by the main light signal detection circuit to the side light signal detection circuit.

14. The control circuit of the portable LED spotlight according to claim 13, wherein the side light signal detection circuit comprises a second detection chip IC2, a resistor R41, a resistor R45, a key S2, a capacitor C17, a resistor R46, an eighth MOS transistor Q8, a resistor R42, a resistor R43, a resistor R44 and a light-emitting diode LED2, wherein a first pin of the second detection chip IC2 is connected to a first terminal of the resistor R41, a second terminal of the resistor R41 is electrically connected to the charging management module, the first pin of the second detection chip IC2 is also electrically connected to an eighth pin of the second detection chip IC2 through the capacitor C17, a second pin of the second detection chip IC2 is electrically connected to the charging management module, a fifth pin of the second detection chip IC2 is connected to a first terminal of the resistor R46 and a gate of the eighth MOS transistor Q8, a second terminal of the resistor R46 and a source of the eighth MOS transistor Q8 are grounded, a drain of the eighth MOS transistor Q8 is connected to a first terminal of the resistor R42, a second terminal of the resistor R42 is connected to a cathode of the light-emitting diode LED2, an anode of the light-emitting diode LED2 is connected to the charging management module, the resistor R43 is connected to the a first terminal and a second terminal of the resistor R42 in parallel, the resistor R44 is connected to a first terminal and a second terminal of the resistor R43 in parallel, a sixth pin of the second detection chip IC2 is electrically connected to the charging management module, a seventh pin of the second detection chip IC2 is electrically connected to a first terminal of the resistor R45 and a first terminal of the key S2, a second terminal of the resistor R45 is electrically connected to the first pin of the second detection chip IC2, and a second terminal of the key S2 is grounded.

15. The control circuit of the portable LED spotlight according to claim 10, wherein the charging management module comprises a main light charging management circuit and a side light charging management circuit, wherein the main light charging management circuit comprises a first charging management chip U2, a resistor R1, a resistor R2, a resistor R5, a capacitor C1, a capacitor C2, a capacitor C3, a capacitor C4, an interface MICROUSB1, a resistor R12, a resistor R13, an inductor L1, a resistor R9, a capacitor C9, a capacitor C5, a capacitor C8, a capacitor C6, a capacitor C7 and a pin header BT1, wherein a first pin the first charging management chip U2 is connected to a first terminal of the resistor R5, a second terminal of the resistor R5 is connected to a first terminal of the capacitor C4, a second terminal of the capacitor C4 is grounded, the first pin of the first charging management chip U2 is grounded through the capacitor C3, the capacitor C2 is connected to a first terminal and a second terminal of the capacitor C3 in parallel, the first pin of the first charging management chip U2 is also electrically connected to an emitter of a first triode Q1 and an emitter of a fourth triode Q4 in a signal transmission module through the resistor R2, a terminal, electrically connected to the signal transmission module, of the resistor R2 is also connected to a first port of the interface MICROUSB1, a second port of the interface MICROUSB1 is grounded, the capacitor C1 is connected between the first port and the second port of the interface MICROUSB1, a second pin of the first charging management chip U2 is connected to a first terminal of the resistor R12, a second terminal of the resistor R12 is electrically connected to a fifth pin P5 of a first detection chip IC1 in the signal detection module through a resistor R26, a terminal, connected to the signal detection module, of the resistor R12 is grounded through the resistor R13, a third pin of the first charging management module U2 is connected to a battery pack through the resistor R1, an eighth pin of the first changing management chip U2 is connected to the USB interface module, a seventh pin of the first charging management chip U2 is connected to a first terminal of the inductor L1, a second terminal of the inductor L1 is connected to a first terminal of the resistor R9, a second terminal of the resistor R9 is connected to the capacitor C9, a second terminal of the capacitor C9 is grounded, a terminal, connected to the capacitor C9, of the resistor R9 is also connected to a sixth pin of the first charging management chip U2, the terminal, connected to the resistor R9, of the inductor L1 is also connected to the capacitor C5, a second terminal of the capacitor C5 is grounded, the capacitor C8 is connected to a first terminal and the second terminal of the capacitor C5 in parallel, the capacitor C6 is connected to a first terminal and a second terminal of the capacitor C8 in parallel, the capacitor C7 is connected to a first terminal and a second terminal of the capacitor C6 in parallel, the terminal, connected to the resistor R9, of the inductor L1 is also connected to the battery pack and a second port of the pin header BT1, and a first port of the pin header BT1 is grounded.

16. The control circuit of the portable LED spotlight according to claim 15, wherein the side light charging management circuit comprises a resistor R34, a resistor R37, a resistor R35, a resistor R40, a seventh triode Q7, a sixth MOS transistor Q6, a capacitor C15, a resistor R36, a red-green light-emitting diode RGLED1, a resistor R38, a second charging management chip U3, a capacitor C16, a battery BT2, a diode D3 and a resistor R50, wherein a fourth pin of the second charging management chip U3 is connected to a first terminal of the resistor R36, a second terminal of the resistor R36 is connected to a first port of the red-green light-emitting diode RGLED1, a second port of the red-green light-emitting diode RGLED1 is connected to a fifth pin of the second charging management chip U3 and a first pin of the second charging management chip U3, a terminal, connected to the second charging management chip U3, of the resistor R36 is also connected to a first terminal of the capacitor C15, a second terminal of the capacitor C15 is grounded, the fourth pin of the second charging management chip U3 is also connected to an anode of the diode D3, a cathode of the diode D3 is connected to a first terminal of the resistor R50, a second terminal of the resistor R50 is connected to a third pin of the second charging management chip U3, a sixth pin of the second charging management chip U3 is grounded through the resistor R38, a second pin of the second charging management chip U3 is grounded, the third pin of the second charging management chip U3 is connected to a first terminal of the capacitor C16, a second terminal of the capacitor C16 is grounded, an anode of the battery BT2 is connected to the third pin of the second charging management chip U3, a cathode of the battery BT2 is grounded, the anode of the battery BT2 is also electrically connected to a first pin of a second detection chip IC2 through the resistor R41 in the side light signal detection circuit, a first terminal of the resistor R34 is connected a collector of a first triode Q1 in the signal transmission module and a source of the sixth MOS transistor Q6, a second terminal of the resistor R34 is connected to a collector of a fourth triode Q4 in the signal transmission module and a first terminal of the resistor R37, a second terminal of the resistor R37 is grounded, a gate of the sixth MOS transistor Q6 is connected to a first terminal of a resistor R39, a second terminal of the resistor R39 is connected to a collector of the seventh triode Q7, a base of the seventh triode Q7 is electrically connected to a sixth pin of the second detection chip IC2 in the side light signal detection circuit through the resistor R40, an emitter of the seventh triode Q7 is grounded, the resistor R35 is connected between the gate and the source of the sixth MOS transistor, and a drain of the sixth MOS transistor Q6 is electrically connected to the fourth pin of a second charging management chip U3.

* * * * *